(12) United States Patent
Hirano et al.

(10) Patent No.: US 7,986,592 B2
(45) Date of Patent: Jul. 26, 2011

(54) COMPONENTS AND ASSEMBLY PROCEDURE FOR THERMAL ASSISTED RECORDING

(75) Inventors: Toshiki Hirano, San Jose, CA (US);
Timothy C. Reiley, San Jose, CA (US);
Barry C. Stipe, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 807 days.

(21) Appl. No.: 12/075,419

(22) Filed: Mar. 10, 2008

(65) Prior Publication Data
US 2009/0225636 A1 Sep. 10, 2009

(51) Int. Cl.
*G11B 11/00* (2006.01)

(52) U.S. Cl. .............. 369/13.24; 369/13.17; 369/13.12; 369/112.27

(58) Field of Classification Search .............. 369/13.33, 369/13.32, 13.12, 13.24, 112.27, 112.29, 369/44.14, 112.26, 13.17; 360/128, 59; 257/98
See application file for complete search history.

(56) References Cited

U.S. PATENT DOCUMENTS

| | | |
|---|---|---|
| 4,854,667 A | 8/1989 | Ebata et al. |
| 5,199,090 A | 3/1993 | Bell |
| 6,181,673 B1 | 1/2001 | Wilde et al. |
| 6,492,614 B2 | 12/2002 | Murdza et al. |
| 6,724,718 B1 | 4/2004 | Shinohara et al. |
| 6,771,589 B2 | 8/2004 | Ueyanagi et al. |
| 6,775,100 B1 | 8/2004 | Belser et al. |
| 6,795,380 B2 | 9/2004 | Akiyama et al. |
| 6,807,141 B2 | 10/2004 | Chang et al. |
| 6,944,112 B2 * | 9/2005 | Challener ............... 369/112.27 |
| 6,996,033 B2 | 2/2006 | Dugas et al. |
| 7,345,316 B2 * | 3/2008 | Sherrer et al. ............... 257/98 |
| 7,483,229 B2 * | 1/2009 | Rausch et al. ............... 360/59 |
| 7,688,689 B2 * | 3/2010 | Gage et al. ............... 369/44.14 |
| 2005/0190682 A1 | 9/2005 | Gage et al. |
| 2006/0187564 A1 | 8/2006 | Sato et al. |
| 2006/0233061 A1 | 10/2006 | Rausch et al. |
| 2007/0081427 A1 | 4/2007 | Suh et al. |

FOREIGN PATENT DOCUMENTS

| | | |
|---|---|---|
| JP | 2003045004 | 2/2003 |
| JP | 2006053976 | 2/2006 |

* cited by examiner

*Primary Examiner* — Ali Neyzari

(57) ABSTRACT

Components for, and assembly of, a thermally assisted recording device involve a laser mounted to a recording head slider. The output from the laser is directed into an optical waveguide, which delivers the laser light to the media to be written. Several challenges with thermally assisted recording are enabled by the use of a laser carrier, which holds and protects the small, relatively fragile laser and serves as a partial heat sink for the power generated by the laser. The laser, carrier and slider are bonded and can be interconnected as a unit to a suspension constituent to a hard disk drive (HDD) device.

14 Claims, 4 Drawing Sheets

COMPONENTS AND ASSEMBLY PROCEDURE FOR THERMAL ASSISTED RECORDING

TECHNICAL FIELD

Embodiments of the invention relate generally to the field of hard disk drives and, more specifically, to thermal assisted recording.

BACKGROUND ART

Electronic computing devices have become increasingly important to data computation, analysis and storage in our modern society. Modern direct access storage devices (DASDs), such as hard disk drives (HDDs), are heavily relied on to store mass quantities of data for purposes of future retrieval. As such long term data storage has become increasingly popular, and as the speed of microprocessors has steadily increased over time, the need for HDDs with greater storage capacity to store the increased amount of data has also steadily increased.

Consequently, there are seemingly constant development efforts to improve the areal density of the media implemented in hard disk drives, where the areal density is measured as the product of bits per inch ("BPI") and tracks per inch ("TPI"). BPI refers to the number of bits that can be written and later reread per linear inch along a track, whereas TPI refers to the number of individual tracks per radial inch. Advancements in areal density, however, are not limitless in conventional magnetic recording. Consequently, thermally assisted recording techniques are developing.

Thermally Assisted Recording (TAR)

Thermally assisted data recording is motivated by limitations in the areal density possible in conventional magnetic recording, known as the superparamagnetic limit. That is, traditional scaling of magnetic grain size will not be possible in the very near future due to random thermal switching of the grains. For written data to be thermally stable for a period of several years (at about 330° K), the minimum size of a magnetic grain is limited to approximately 8 nm. Although materials exist with a minimum stable size of approximately 2 nm, the coercivity of these materials is higher than the maximum attainable field that can be produced by the write head. In order to use high coercivity materials it will be necessary to temporarily heat the media while it is being written. The heating temporarily lowers the coercivity so that magnetic data bits may be orientated by the write head. Heat must be confined to a single data track in order to prevent accidental erasure of adjacent tracks.

With thermally assisted recording, read back of the data is accomplished in the conventional manner. Because the ultimate areal density limit in magnetic recording is determined by the grain size at a given number of grains per bit, thermally assisted recording will permit areal data densities about 10 times higher than are possible in conventional magnetic recording.

With thermally assisted recording techniques, heating from a near-field optical source temporarily lowers the coercivity of the media so that magnetic data bits may be orientated by the write head. Bits are "set" when the coercivity of the media is less than the applied field. Because the dynamic coercivity of the media drops with temperature, the sharpness of the magnetic transition and, therefore, the in-track bit density, is determined by a combination of the media temperature gradient at the trailing edge of the heated region and the magnetic field gradient. The temperature gradient is likened to a field gradient according to $dH_0/dx=(dT/dx)*(dH_0/dT)$, where H refers to coercivity at very short time-scales, x to distance, and T to temperature. Ideally, to achieve the highest total effective field gradient and the sharpest magnetic transitions in the media, the trailing edge thermal gradient from the near-field optical source and the gradient from the magnetic write head should overlap. In general, this is difficult to achieve because the magnetic pole pieces must allow for an optical path to the near-field source without large optical losses.

For TAR to be effectively realized, it will be necessary to confine heat to a single data track approximately 50 nm wide or smaller, with high efficiency. Candidate near-field optical sources typically use a low-loss metal (Au, Ag, Al, Cu) shaped in such a way to concentrate surface charge motion at a tip apex located at the slider air bearing surface (ABS) when light is incident. Oscillating tip charge creates an intense near-field pattern, heating the disk. Sometimes, the metal structure can create resonant charge motion (surface plasmons) to further increase intensity and disk heating. For example, when polarized light is aligned with the corner of a triangular-shaped gold plate, an intense near field pattern is created at that corner. Resonant charge motion can occur by adjusting the triangle size to match a surface plasmon frequency to the incident light frequency.

Another near-field transducer is the ridge slot waveguide from microwave circuits applied to optical frequencies (also known as the "c-aperture"). This shape is characterized by five parameters, including the metal thickness. Light polarization is aligned with the ridge and incident light concentrates surface charge at the tip of the ridge. Previously, a ridge waveguide in silver has been optimized at a wavelength of 516 nm and a metal-to-metal fly-height of 8 nm. Furthermore, far field measurements obtained for various c-aperture sizes indicate a spectral shift, while narrow resonant behavior has been observed when a pattern of ridges is used to excite surface plasmons around a long slot waveguide and enhance far field transmission.

SUMMARY OF EMBODIMENTS OF THE INVENTION

Components for, and assembly of, a thermally assisted recording device are described. Thermally assisted recording techniques utilize a localized heat source to increase the temperature of a magnetic bit such that the coercivity of the magnetic media is substantially reduced. By design, this coercivity drops to a level which allows the field from the writer to orient the bit. Once the temperature is reduced to room temperature, the bit is effectively permanently "frozen" in the written orientation.

The approaches described here use a laser mounted to a recording head slider. The output from the laser is directed into an optical waveguide, which delivers the laser light to the media to be written. Several challenges with thermally assisted recording are enabled by the use of a laser carrier, which holds and protects the small, relatively fragile laser and serves as a partial heat sink for the power generated by the laser. The laser, carrier and slider are bonded and can be interconnected as a unit to a suspension constituent to a hard disk drive (HDD) device.

Examples of some of the challenges that can be met with the approaches described herein include that (1) the carrier can be bonded to the laser with a relatively high melting point solder; (2) the carrier has the same or nearly the same coefficient of thermal expansion as the laser, to avoid thermal distortion of the assembly; (3) the carrier-laser assembly allows the laser to be activated such that the emitted light from the laser can be aligned with the slider waveguide; (4) while maintaining the active alignment, the laser-carrier assembly is permanently joined to the slider; and (5) the geometry of the electrical contacts of the laser and the slider allows the slider and laser to be simultaneously bonded to a suspension.

Furthermore, methods are described for efficiently assembling a thermally assisted recording device using what are currently considered relatively conventional manufacturing techniques in the HDD industry.

BRIEF DESCRIPTION OF THE DRAWINGS

The accompanying drawings, which are incorporated in and form a part of this specification, illustrate embodiments of the invention and, together with the description, serve to explain the principles of the invention. The drawings are used merely to illustrate principles of the illustrated embodiments, and it is understood that components described in these embodiments have not been drawn to scale.

DETAILED DESCRIPTION

Figure 1:
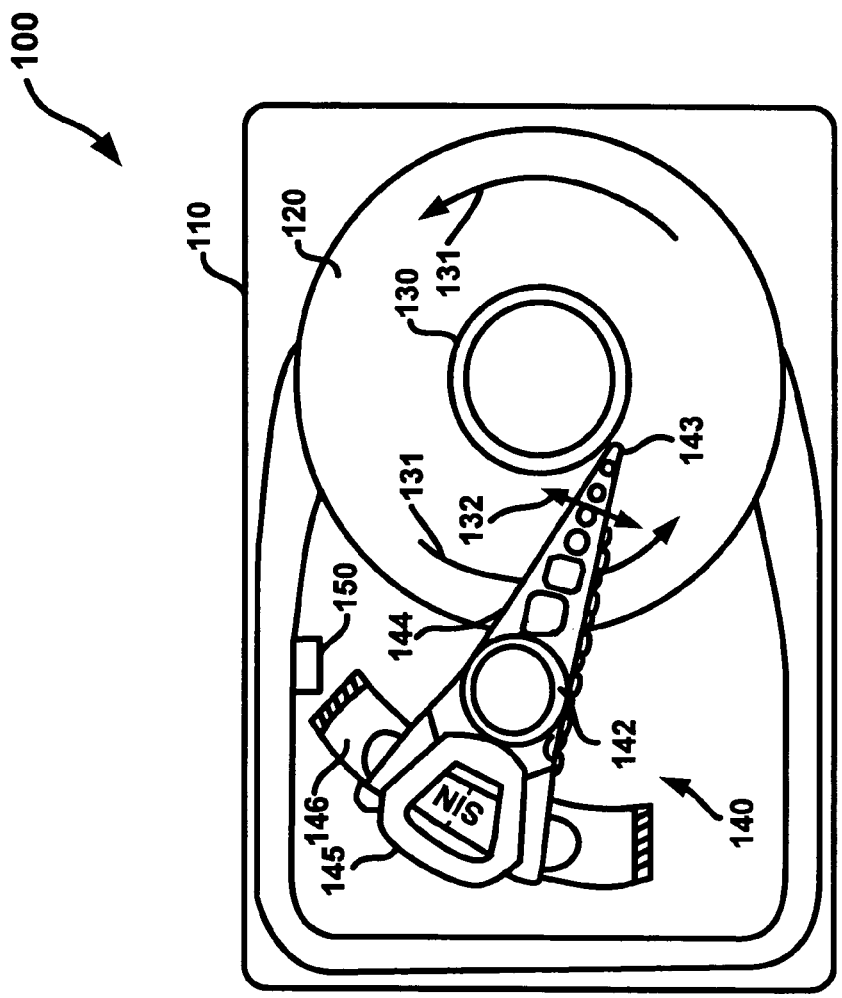
FIG. 1 is plan view of a hard disk drive (HDD), in accordance with an embodiment of the present invention.

Reference will now be made in detail to embodiments of the present technology, examples of which are illustrated in the accompanying drawings. While the technology will be described in conjunction with various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

Overview

Embodiments of the present invention comprise an apparatus for thermally assisted recording in hard disk drive (HDD) devices, comprising an optical source (e.g., a semiconductor laser) for heating a portion of media on which data is to be recorded, a carrier with which the optical source is coupled, and an air bearing slider comprising a read/write head, with which the carrier is coupled, for flying over the media to facilitate thermally assisted recording of data on the media.

It should be understood by those skilled in the art that various embodiments of the present invention increase the performance quality of a hard disk drive (HDD) because of the increased areal density that is enabled through use of thermally assisted recording, generally. Furthermore, it should be understood by those skilled in the art that various embodiments of the present invention maintain the efficiency of a hard disk drive (HDD) manufacturing process due to an abundant use of currently conventional manufacturing technologies in the production of a thermally assisted recording device.

Numerous specific embodiments will now be set forth in detail to provide a more thorough understanding of the present technology. The discussion of these detailed embodiments will begin with an overview of a hard disk drive (HDD), and the components connected therein, according to embodiments of the present invention. The discussion will then focus on embodiments of the invention that provide an apparatus for thermally assisted recording in HDD and other devices, and assembly thereof.

However, it should be understood by those skilled in the art that the present technology may be practiced without the specific details of the embodiments disclosed herein. In other instances, well known methods, procedures, components, and circuits have not been described in detail as not to unnecessarily obscure aspects of the present embodiments.

Furthermore, although embodiments of the present invention will be described in conjunction with a slider in a hard disk drive (HDD), it is understood that the embodiments described herein are useful outside of the art of hard disk drive (HDD) design, manufacturing and operation. The utilization of the rotating slider example is only one embodiment and is provided herein merely for purposes of brevity and clarity.

Hard Disk Drive (HDD) Configuration

FIG. 1 is plan view of a hard disk drive (HDD), in accordance with an embodiment of the invention. With reference now to FIG. 1, a schematic drawing of one embodiment of an information storage system comprising a magnetic hard disk file or drive 100 for a computer system is shown. Drive 100 has an outer housing or base 110 containing a disk pack comprising at least one magnetic storage medium 120. A spindle motor assembly having a central drive hub 130 rotates the magnetic storage medium 120 in a circular direction. In this way, the magnetic storage medium 120 is rotated within the outer housing or base 110 by the spindle motor assembly and central drive hub 130 such that data may be read from and written to various points on the surface of the magnetic storage medium 120.

The drive 100 further includes an actuator assembly 140 that comprises one or more parallel actuator arms 141 (one shown) in the form of a comb that is movably or pivotally mounted to the base 110 about a pivot assembly 142. A voice coil 145, free to move within a conventional voice coil motor (VCM) magnet assembly 146 (top pole not shown), is also mounted to one or more actuator arms 141. In one embodiment, a controller 150 is also mounted to the base 110, or otherwise, for selectively moving one or more parallel actuator arms 141 relative to the magnetic storage medium 120. The voice coil motor magnet assembly 146 comprises a magnet located next to the voice coil 145 such that an electrical current traveling through the voice coil 145 generates a magnetic field through the coil, through a process of magnetic inductance, thus causing the actuator arm 141 to move relative to the pivot assembly 142. The controller 150 is configured to control the current traveling through the voice coil 145 so as to control the rotation of the actuator arm 141 about the pivot assembly 142.

The actuator arm 141 is coupled with a head gimbal assembly (HGA) that comprises a magnetic read/write head (not shown), which is coupled with a slider 143. Movement (illustrated by arrows 132) of the actuator arm 141 causes the HGA to move along radial arcs across tracks on the magnetic storage medium 120 until the magnetic read/write head settles on its set target track. The magnetic read/write head coupled with the slider 143 reads data from and magnetically writes data to data arrays comprising radially-spaced data information tracks located on the surface of the magnetic storage medium 120.

However, it should be understood by those skilled in the art that each of a plurality of parallel actuator arms 141 in the drive 100 may have its own head gimbal assembly. Thus, in such a configuration, the head gimbal assemblies of the plurality of parallel actuator arms 141 operate in a conventional manner and move in unison with one another, unless drive 100 uses multiple independent actuators (not shown) comprising actuator arms configured to move independently of one another. Furthermore, it should be understood by those skilled in the art that the thermally assisted recording assembly and procedures described herein may be applicable to recording technologies other than pure magnetic recording, for a non-limiting example, magneto-optical recording.

Thermally Assisted Recording Device

As mentioned, thermally assisted magnetic recording (TAR) uses a localized heat source to increase the temperature of a magnetic bit such that the coercivity of the magnetic media is substantially reduced. By design, this coercivity drops to a level which allows the field from the writer to orient the bit. Once the temperature is reduced to room temperature, the bit is effectively permanently "frozen" in the written orientation.

Figure 2:
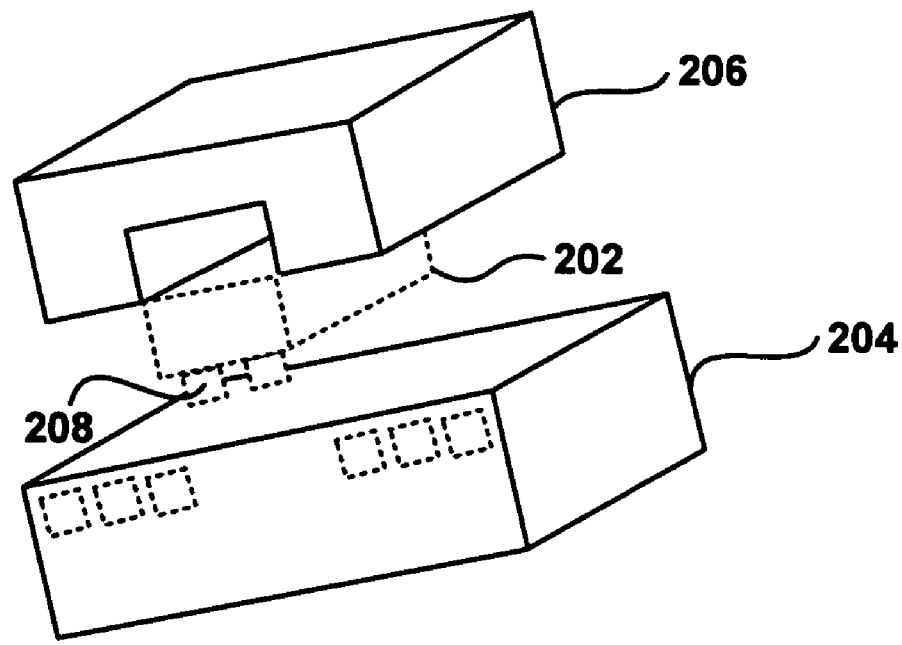
FIG. 2 is an exploded view of three components of a thermally assisted recording assembly, according to an embodiment of the invention, illustrating the components' vertical positioning in exploded form.
Figure 3:
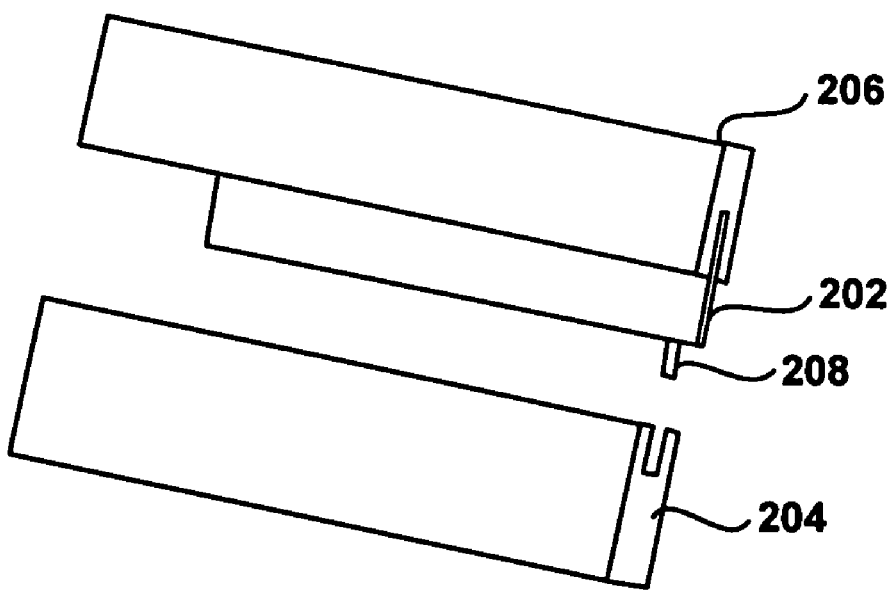
FIG. 3 is an exploded view of three components of a thermally assisted recording assembly, according to an embodiment of the invention, illustrating the components' horizontal positioning in exploded form.

FIG. 2 and FIG. 3 are exploded views of three components of a thermally assisted recording assembly 200, according to an embodiment of the invention. FIG. 2 illustrates the components' vertical positioning in exploded form, while FIG. 3 illustrates the components' horizontal positioning in exploded form.

Laser

Embodiments described herein utilize a laser 202 mounted to a recording head slider 204. The laser 202 may comprise, for a non-limiting example, what is referred to as a diode laser, a semiconductor laser, a HCSEL (Horizontal Cavity Surface Emitting Laser), and the like. The output from the laser 202 is directed into an optical waveguide (not shown), which delivers the laser light to the media to be written. Preferably, at the end of the waveguide is a near field transducer which focuses the light, e.g., so that the laser spots transmitted to the media are smaller than the laser wavelength.

Fabrication of the laser may comprise the following process. On the frontside, with photoresist protecting the laser beam emitting region and contact regions: (1) deposit an insulating layer (e.g., 50 nm TiN); (2) deposit Cr/Au for solder wetting; and (3) plate two contact studs (Cu/Au), approximately 50 μm cubes. On the backside, after thinning, (1) deposit an insulating layer (e.g., 50 nm TiN) for electrical isolation; and (2) deposit Cr/Au for solder wetting.

Laser Carrier

According to an embodiment, configuring the laser 202 and the slider 204 to function together is enabled by the use of a laser carrier 206, which is assembled into a functional unit along with the laser 202 and the slider 204. Generally, the laser carrier 206 holds and protects the small, relatively fragile laser 202 to improve the mechanical robustness. Furthermore, the laser carrier 206 serves as a heat sink for the power generated by the laser 202 and assists in spreading the heat from the laser 202 for flow to the media 120 (FIG. 1) via the slider 204. The laser 202, carrier 206, and slider 204 are bonded and interconnected as a unit, as described hereafter.

The material of the slider 204 has maximum temperature that can be applied to it before degradation occurs (at approximately 120-150 C). SnAu is typically (e.g., in CD players) the high temperature solder used to secure a semiconductor laser to another component. However, the temperature needed to melt tin gold solder is too high for and will degrade the material from which sliders are constructed. Consequently, a relatively lower temperature solder, or epoxy, is typically used to bond a laser to a slider. However, with use of a laser carrier 206 as described herein, a high temperature solder can be used for bonding the laser into an assembly because the laser is assembled to the carrier rather than to the slider directly. Hence, more typical and commonly used solder materials and procedures can be used, thereby allowing a more efficient manufacturing process.

According to an embodiment, the carrier 206 is bonded to the laser 202, preferably with a relatively high melting point solder, such as Sn80-Au20. According to an embodiment, the carrier 206 has the same or nearly the same coefficient of thermal expansion as the laser 202, to avoid thermal distortion of the assembly 200.

The laser/carrier assembly allows the laser 202 to be activated such that the emitted light from the laser 202 can be aligned with the slider waveguide. According to an embodiment, while maintaining the active alignment, the laser/carrier assembly is permanently joined to the slider 204. The geometry of the electrical contacts of the laser 202 and the slider 204 allows the slider 204 and the laser 202 to be simultaneously bonded to a suspension.

According to an embodiment, the laser carrier 206 is a simple grooved body. According to an embodiment, the laser carrier 206 is constructed from a standard slider body material, such as AlTiC (a two-phase, Al2O3-TiC ceramic.) This material matches the coefficient of expansion of GaAs, which constitutes the bulk of the laser 202 material. Other materials may be used for the carrier, for a non-limiting example, AlN. According to an embodiment, the preferred dimensions of the carrier are approximately 850×500×<200 microns.

According to an embodiment, the underside of the carrier 206, including the groove, is sputter coated with an insulator with a good thermal conductivity, such as TiN. This provides electrical isolation of the carrier 206 and laser 202, but with reasonable heat transmission from the laser 202 through the solder joint to the carrier 206. The thermal conductivity of TiN is 29 W/mK and its resistivity is $1.3 \times 10^6$ Ω-m.

According to an embodiment, the carrier is fabricated by using a diamond saw to make slots in the AlTiC (or other, e.g., AlN) wafer, where the slot depth is less than the laser thickness. Then, Cr/Au is sputtered for solder wetting and the Cr/Au is lapped from the wafer surface, leaving Cr/Au only in the slots. Next, AuSn solder paste is applied within the slots, and reflowed. The wafer is then coupled to a second substrate, e.g., using a wax carrier, and the backside of the wafer is ground, thereby bringing the wafer to a desired thickness. Further, a diamond saw can be used to bring the carriers to a final length and width.

According to an alternative embodiment, the carrier 206 is an un-grooved plate of AlTiC, in which case the glue joint (or solder joint) described below is between the laser 202 and the slider 204. In such a configuration, the carrier 206 is used for mechanical protection but is not directly bonded to the slider 204. Preferably, a transparent carrier material (such as sapphire) and a transparent adhesive material are used. To make use of traditional high temperature SnAu solder between the laser 202 and the slider 204, without exceeding the low temperature budget of the slider 204, an external laser beam is focused through the carrier 206 and laser 202 body (at a wavelength at which the laser 202 body is transparent) to reflow the solder locally. With the use of pulsed mode and scanning, it is possible to reflow the solder without exceeding the slider temperature budget. Alternatively, an AlN carrier could be used in this scenario.

According to an embodiment, the heat dissipation of the laser 202 to the carrier 206 is enhanced, as follows. Since a groove cut into the carrier 206 has slightly rounded corners (e.g., saw edge rounding), the side of the laser 202 is not in contact with the groove. According to this embodiment, the spaces on both sides of the laser 202 are filled with molten solder. For example, one could apply a wettable layer of sputter material after the insulating material, e.g., TiN, to the bottom side of the carrier 206 including the groove. Once the laser is mounted to the carrier, another reflow cycle may be performed in which molten solder (e.g., indium or SnBi) is allowed to melt into the groove and wick into the metal-coated sides of the groove.

According to one embodiment, the carrier 206 comprises a microactuator, in a dual-stage actuation system. Thus, the laser 202 is directly coupled with the microactuator and, therefore, moves over the media 120 (FIG. 1) in conjunction with the microactuator. In such a configuration, the relatively fragile laser 202 is mechanically protected by the microactuator.

Air Bearing Slider

The slider 204 may be fabricated as follows. For slider backside preparation, prior to ABS processing on the frontside (while protecting waveguide region on backside), (1) RIE (Reactive-Ion Etch) a trench several microns deep, wider than the laser, and strip resist; (2) deposit a Cr/Au seedlayer (while protecting waveguide region); (3) Pattern electroplate Sn—Bi or In solder inside the trench (e.g., narrower and higher than the trench); (4) strip photoresist; and (5) sputter etch the exposed Cr/Au seedlayer (while protecting waveguide).

Assembly of Laser, Carrier, and Air Bearing Slider

On the laser 202 there are two plated studs 208 which are designed to allow attachment (i.e., as bond pads) to the suspension, as described hereinafter. According to an embodiment, the studs 208 are copper studs with a plated gold exterior. The size of the studs 208 allows the laser 202 to be probed and activated during laser/slider alignment. For example, the size of the studs 208 may be on the order of 50 μm per stud. Upon assembly of the laser 202 and carrier 206 assembly with the slider 204, the plated studs 208 extend downward, slightly in front of the bonding surface of the slider 204. Thus, external probes can be pressed against the studs 208 to activate the laser 202. Alternatively, according to an embodiment, a wire bonding process is used to essentially create studs, or laser bonding pads, after bonding the laser 202 to the carrier 206 before assembly with the slider 204.

With the plated stud 208 configuration depicted in FIGS. 2 and 3, both the N-electrode and the P-electrode are configured on the same area of the laser 202 on the plated stud 208, i.e., proximate to the laser/slider interface. In an alternative embodiment, the N-electrode is configured on one side of the laser 202 and the P-electrode is configured on the opposite side of the laser 202. For example, the laser 202 would have one plated stud 208 in an upward direction from the laser body (e.g., comprising the N-electrode) and one plated stud 208 in a downward direction from the laser body (e.g., comprising the P-electrode). Such a configuration could facilitate the manufacturing process by enabling the use of a more conventional semiconductor laser.

During alignment of the laser with the waveguide, once the laser output is optimized through the waveguide, a glue joint is partially made between the slider 202 and carrier 206 along the two longitudinal edges. The preferred choice is a thermal tacking operation which pins the edge fillets. The thermal energy can be provided by two lasers on either side of the laser 202/carrier 206/slider 204 ("complete") assembly. The complete assembly (clamped or not) is then given a thermal cure to fix the adhesive between the upper surface of the slider 204 and the lower surface of the carrier 206. Although some form of permanent tacking operation is useful to ensure alignment, a low-temperature solder joint may be made between the laser 202 and the slider 204 using such solders as In or In—Sn, according to an embodiment. This joint could be reflowed during the adhesive curing operation.

Figure 4:
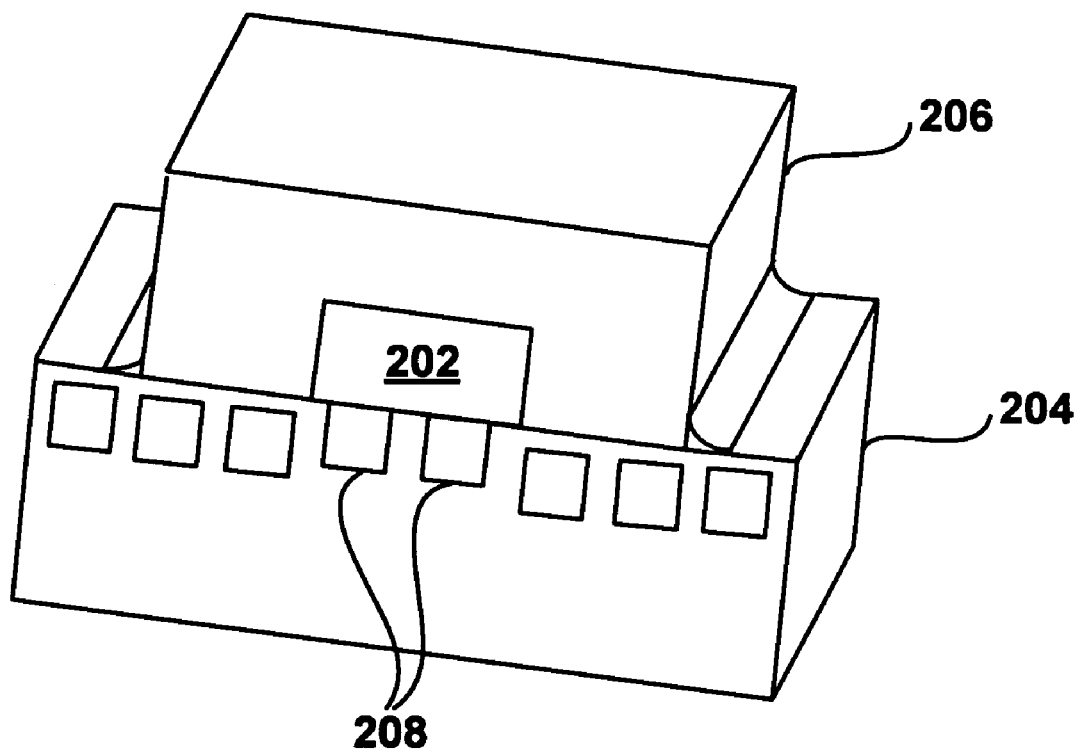
FIG. 4 is a diagram illustrating an assembled thermally assisted recording assembly, according to an embodiment of the invention.

FIG. 4 is a diagram illustrating an assembled and glued thermally assisted recording assembly 400, according to an embodiment of the invention. According to an embodiment, if the laser carrier 206 is grooved, the laser 202 body protrudes slightly beyond the bottom surface of the carrier 206 to ensure thermal contact to the slider 204.

Alternative: Direct Laser/Slider Attachment

In an alternative embodiment, the laser 202 is directly soldered to slider 204, and then capped. This approach is similar to the foregoing laser/carrier approach, but with only one solder joint (of lower temperature solder). Fabrication of the laser 202 and of the slider 204 may comprise the same procedures as described herein for the laser 202 to carrier 206 approach.

Assembly of the laser 202 to the slider 204 may be according to the following procedure. Align the laser 202 with the waveguide and, when aligned, use laser heating to locally reflow small regions of solder at laser-slider joints on both edges. After, the laser 202 and the slider 204 are clamped together, and a solder reflow process is performed. Typically, the laser 202 is now tested. Then, using electrically conductive adhesive, a cap is glued to the laser and slider and the assembly is cured.

Assembly of Laser/Carrier/Slider Assembly to Suspension

At this point the complete assembly may be joined to the suspension. This is normally accomplished by bringing horizontally oriented metallic fingers close to the bonding pads. Small solder balls are placed in the right-angle made between finger and pad, and then a laser is used to melt the solder to make connection between the suspension leads and the pads. In this disclosed structure the studs protruding beneath the laser act as bond pads equivalent to those shown on the slider. There is a slight offset in the longitudinal direction between the ends of the suspension leads which mate to the laser and those which mate to the slider. This offset is on the order of the thickness of the laser studs. This allows a conventional suspension and bonding procedure to be utilized, e.g., solder ball or solder reflow bonding.

It should be understood that although various embodiments of the present invention are described in the context of rotating a slider relative to a magnetic storage medium in a hard disk drive (HDD), the foregoing embodiments are merely exemplary of various implementations of principles of the present technology. Therefore, it should be understood that various embodiments of the present invention may apply to any devices, configurations, or systems in which thermally assisted recording is employed.

The foregoing descriptions of specific embodiments of the present invention have been presented for purposes of illustration and description. They are not intended to be exhaustive or to limit the invention to the precise forms disclosed, and many modifications and variations are possible in light of the above teachings. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus for thermally assisted recording in hard disk drive (HDD) devices, comprising:
    an optical source, for heating a portion of a media on which data is to be recorded, wherein said optical source comprises at least one plated stud extending downward for electrical bonding;
    a carrier, with which said optical source is coupled to produce an optical source-carrier assembly;
    an air bearing slider comprising a read/write head, with which said carrier is coupled, for flying over said media to facilitate thermally assisted recording of data on said media; and
    wherein said optical source-carrier assembly presents said at least one plated stud slightly in front of a bonding surface of said air bearing slider, said stud configured for use in activating said optical source upon coupling of said optical source-carrier assembly with said air bearing slider.

2. The apparatus recited in claim 1, wherein said carrier comprises a groove in which said optical source is recessed.

3. The apparatus recited in claim 1, wherein said carrier comprises a microactuator in a dual-stage actuation system.

4. The apparatus recited in claim 1, wherein said carrier is bonded to said optical source using SnAu solder.

5. The apparatus recited in claim 1, wherein said carrier comprises AlTiC.

6. The apparatus recited in claim 1, wherein an area of said carrier at which said optical source is coupled comprises a sputter coated insulator comprising TiN.

7. The apparatus recited in claim 1, wherein said carrier comprises a transparent material, and wherein said optical source is bonded to said slider using SnAu solder and an external laser beam focused through said carrier and said optical source to reflow said solder locally.

8. A hard disk drive (HDD) device comprising:
    a housing;
    a magnetic storage medium coupled with said housing, said magnetic storage medium rotating relative to said housing;
    an actuator arm coupled with said housing, said actuator arm moving relative to said magnetic storage medium; and
    a slider assembly comprising
        a magnetic read/write head that magnetically writes data to and magnetically reads data from said magnetic storage medium;
        an optical source, for heating a portion of said magnetic storage medium on which data is to be written, wherein said optical source comprises at least one plated stud extending downward; and
        a carrier, with which said optical source is coupled; and
        wherein said optical source presents said at least one plated stud slightly in front of a surface at which said optical source is bonded with said slider, said stud configured for use in activating said optical source.

9. The hard disk drive device recited in claim 8, wherein said carrier comprises a groove in which said optical source is recessed.

10. The apparatus recited in claim 8, wherein said carrier comprises a microactuator in a dual-stage actuation system.

11. The apparatus recited in claim 8, wherein said carrier is bonded to said optical source using SnAu solder.

12. The apparatus recited in claim 8, wherein said carrier comprises AlTiC.

13. The apparatus recited in claim 8, wherein an area of said carrier at which said optical source is coupled comprises a sputter coated insulator comprising TiN.

14. The apparatus recited in claim 8, wherein said carrier comprises a transparent material, and wherein said optical source is bonded to said slider using SnAu solder and an external laser beam focused through said carrier and said optical source to reflow said solder locally.

* * * * *